UNITED STATES PATENT OFFICE.

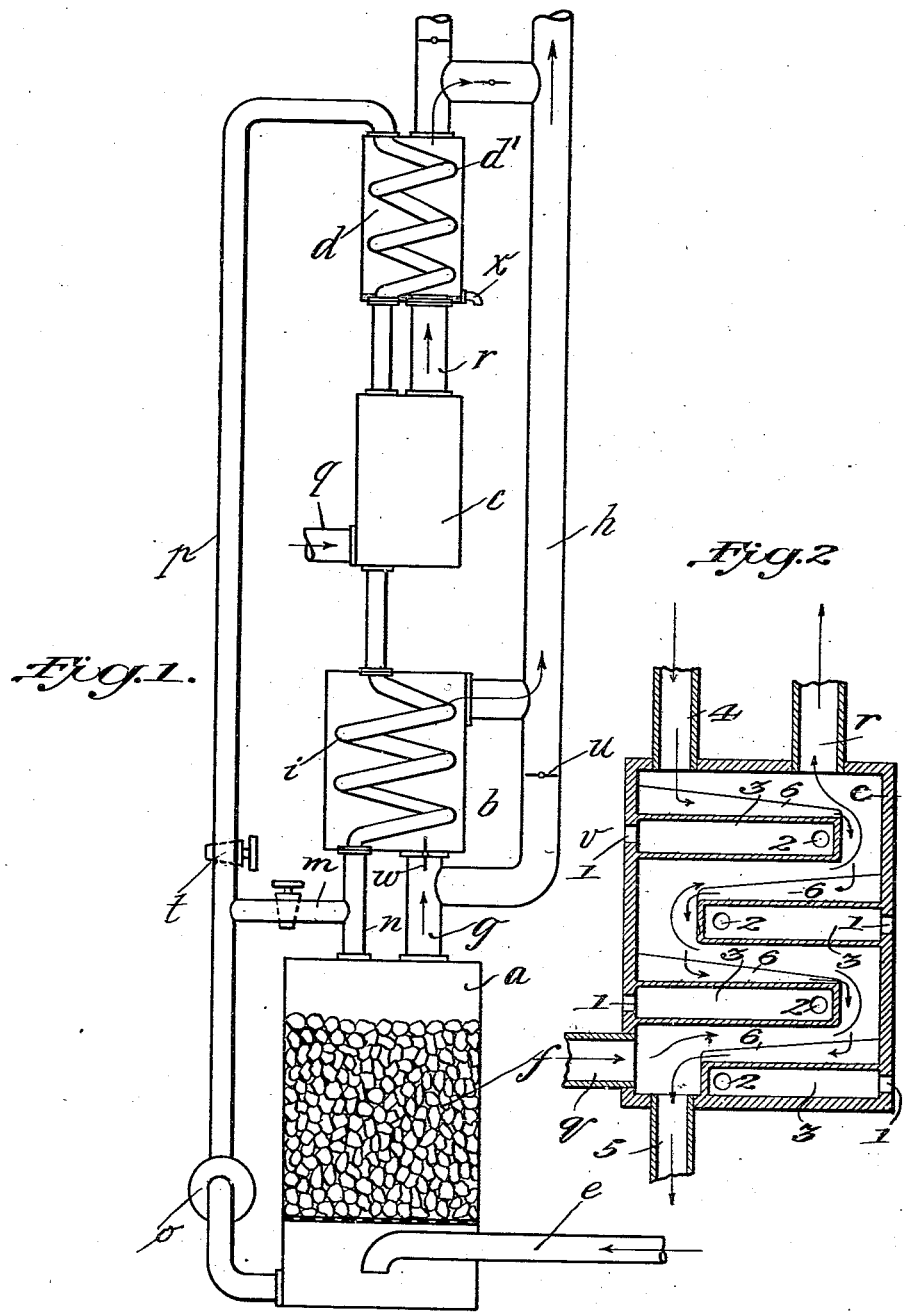

GEORG ERLWEIN, OF CHARLOTTENBURG, GERMANY.

APPARATUS FOR PRODUCING DRY HEATED AIR.

1,069,241. Specification of Letters Patent. Patented Aug. 5, 1913.

Application filed June 15, 1911. Serial No. 633,344.

*To all whom it may concern:*

Be it known that I, GEORG ERLWEIN, a subject of the German Emperor, and residing at Charlottenburg, near Berlin, Germany, have invented a certain new and useful Improved Apparatus for Producing Dry Heated Air, of which the following is a specification.

My invention relates to a process of obtaining dry, heated air, such as is required, for example, for drying wood or other vegetable or animal substances, and to apparatus therefor, sulfuric acid being used for the drying process.

According to the invention the air is heated by the heat evolved by sulfuric acid during its regeneration. Particularly, continuous operation is obtained by part of the sulfuric acid leaving the irrigation tower being returned by means of a pump or the like directly to the tower, and part by way of a regenerating apparatus in which it is concentrated by its being heated in a current of air. The hot sulfuric acid leaving the regenerating apparatus is conducted through a heat equalizer, through which the dry air leaving the tower is also passed, so that the sulfuric acid gives up part of its heat to the air and returns cooled into the tower, while the air leaves the equalizer after having been heated therein.

One form of apparatus according to my invention for carrying my improved process into practice is represented in the accompanying drawings, in which, Figure 1 is a diagrammatic elevation, partly in section; Fig. 2 is a vertical section on an enlarged scale of the regenerator.

Referring to the drawings, $a$ designates the irrigation tower, $b$ the heat equalizer and $c$ the regenerating apparatus. Fresh air enters through the pipe $e$, flows through the filling $f$ over which the sulfuric acid trickles, passes through the connecting pipe $g$ into the heat equalizer $b$ and leaves the latter through the pipe $h$.

The sulfuric acid is lifted by the pump $o$ in the pipe $p$ and part of it returns directly through the pipes $m$, $n$ into the tower, while part of it goes on through the pipe $p$ and through the pipe $d'$ into the regenerating apparatus $c$ and thence to the heat equalizer $b$, in which it flows through a coiled pipe $i$, around which the dried air flows, whereupon the acid returns through the pipe $n$ into the irrigation tower.

The quantity of sulfuric acid flowing through the pipe $p$ to the regenerating apparatus can be regulated by a valve $t$. A stopcock may be provided in the pipe $m$ also, so that it is readily possible to regulate as desired the proportion of the acid returning direct to the tower to that returning thereto by way of the regenerating apparatus.

The regenerating apparatus $c$ is preferably constructed as shown in Fig. 2, in which the sulfuric acid saturated with moisture, enters through the pipe 4 and is conducted over and around the heating compartments 3 provided with heat radiating ribs or fins 6. Said compartments may derive their heat from heated fluids or gases entering at 1 and emerging at 2. At the same time cold air enters at $q$ and passes out at $r$ after becoming heated and saturated with sulfuric acid and steam. This heat is employed for preliminarily heating the sulfuric acid before it is supplied to the regenerating apparatus. Accordingly, in the illustrative embodiment a preheater or economizer $d$ is shown, through which the sulfuric acid is conducted, for example by means of a coiled pipe $d'$, while the air entering at $q$ into the regenerator $c$ passes through the pipe $r$ into the preheater $d$. The air there parts with its heat to the sulfuric acid, while a corresponding quantity of water containing but little sulfuric acid which had been absorbed by the air in the regenerating apparatus is precipitated on the cooler parts of the preheater. The precipitated liquid collects in the lower part of the preheater and can be drawn off by way of the draining cock $x$.

As the vapor tension of the mixture of water and sulfuric acid is materially less than that of water alone, a materially larger quantity of water is precipitated in the preheater $d$ from the air than would be the case at the same temperature if the air contained only water vapor. Consequently, the air leaving the preheater is relatively dry and can therefore be introduced into the main air-pipe $h$ for being subsequently used in the event of its not being preferred, say for special reasons to discharge it into the open air. By suitably arranging valves in the air pipes the air can be conducted into the main air-pipe or into the open air as required.

In order to be able exactly to regulate the temperature of the air led away through the air pipe $h$ it is preferable to provide an additional branch pipe $v$ which directly connects the pipe $g$ and the pipe $h$, thereby evading the equalizer $b$. I then preferably provide in this connecting pipe $v$ a regulating valve $u$ which admits of the ratio of the quantity of air passing the equalizer $b$ and the pipe $v$ being regulated. A second regulating valve $w$ which admits of wholly or partially shutting off the air from the equalizer may be provided in the pipe $g$.

The described process and apparatus not only admit of very uniform and continuous operation, but simultaneously enable the heat to be very suitably utilized and such a diminution of the working costs that, for example, the artificial drying of animal and vegetable foods for the purpose of preserving them is made economically possible. At the same time the process has the advantage of very great certainty and simplicity of operation, and the percentage of moisture in, and the temperature of the air can be exactly regulated.

I claim:—

1. In apparatus for producing dried heated air, the combination of means producing an interexchange of heat and moisture between air and sulfuric acid, a regenerator for the sulfuric acid, a pipe for conveying air to said interexchanging means, and means for circulating the sulfuric acid successively through said regenerator and interexchanging means.

2. In apparatus for obtaining dry, heated air, the combination with a sulfuric acid irrigation tower, of a pipe for supplying air to the same, a regenerator, a delivery pipe, a heat equalizer provided with separate passageways respectively connecting said regenerator with said tower, and said tower with said delivery pipe, and means for supplying sulfuric acid from the said tower to the regenerator.

3. In apparatus for obtaining dry, heated air, the combination with a sulfuric acid irrigation tower, of a pipe for supplying air to the same, a regenerator, a delivery pipe, a heat equalizer having separate channels respectively connecting said regenerator with said tower, and said tower with the delivery pipe, said regenerator being provided with separate channels for sulfuric acid and heating fluid, a pre-heater provided with separate channels for sulfuric acid and air saturated with sulfuric acid and water vapor, means comprising a pump for supplying acid from the tower to one channel of the pre-heater, such channel being connected to one channel of the regenerator which is in turn connected to one of said channels of the heat equalizer, an air outlet leading from the other channel of the regenerator and an air inlet to said regenerator.

4. In apparatus for obtaining dry, heated air, the combination with a sulfuric acid irrigation tower, of a pipe for supplying air to the same, a regenerator, a delivery pipe, a heat equalizer having separate channels respectively connecting said regenerator with said tower, and said tower with said delivery pipe, said regenerator being provided with separate channels, a pre-heater having two separate channels, and means for supplying acid from the tower to one channel of the pre-heater, which channel is in turn connected by way of one channel of the regenerator with the former channel of the heat equalizer, the other channel of the regenerator being connected with said delivery pipe through the other channel of said preheater.

In testimony whereof, I affix my name to this specification in the presence of two witnesses.

GEORG ERLWEIN.

Witnesses:
E. A. GRISELER,
ROBERT DE YASELLIS.